Oct. 8, 1968  W. P. CROPPER  3,405,358
PEAK READER APPARATUS EMPLOYING A SERVO REBALANCE MOTOR
OPERATING IN A SINGLE DIRECTION
Filed Dec. 13, 1965  2 Sheets-Sheet 1

INVENTOR.
Wendell P. Cropper

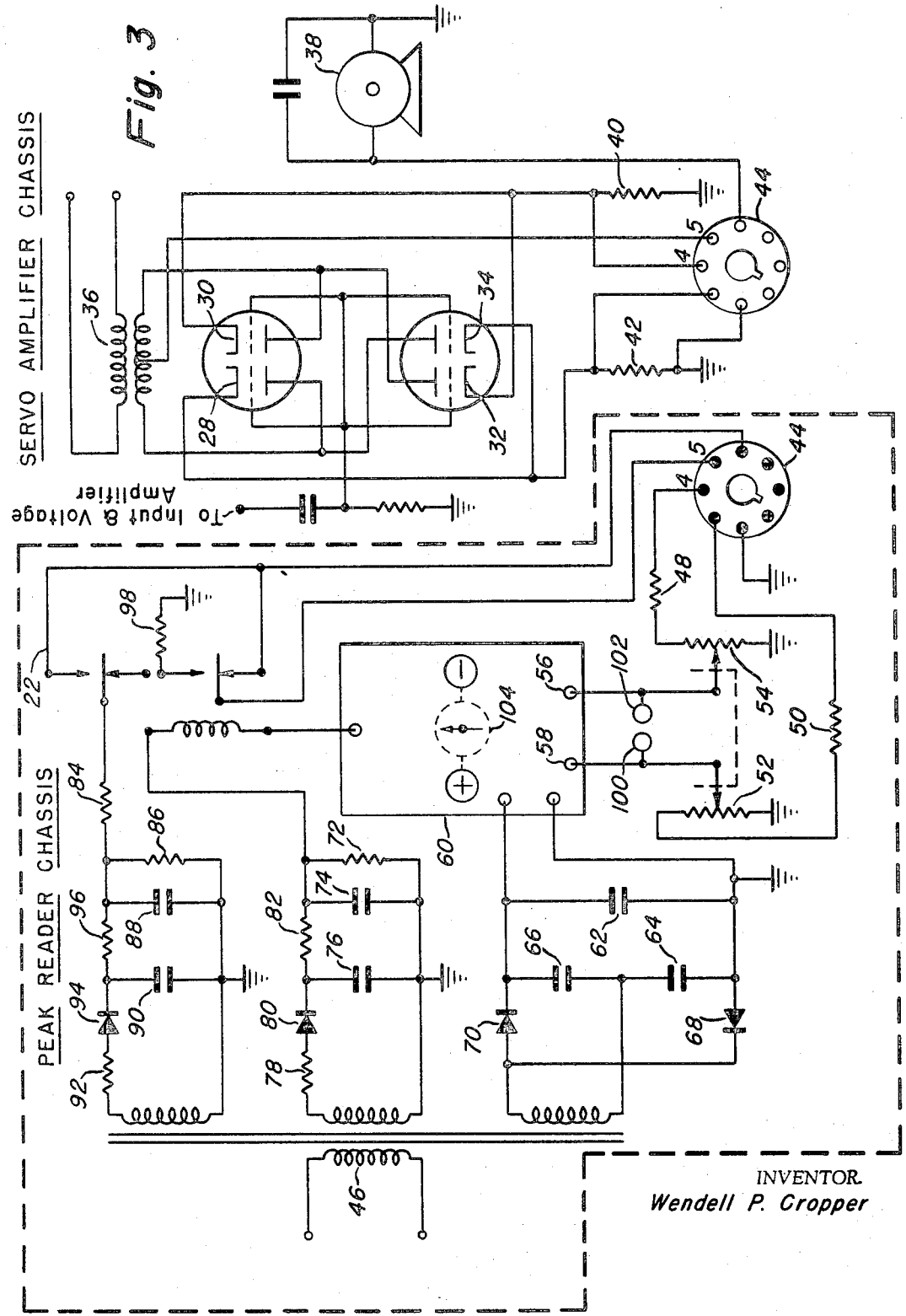

United States Patent Office 3,405,358
Patented Oct. 8, 1968

3,405,358
PEAK READER APPARATUS EMPLOYING A SERVO REBALANCE MOTOR OPERATING IN A SINGLE DIRECTION
Wendell P. Cropper, Olympia Fields, Ill., assignor to Standard Oil Company, Chicago, Ill., a corporation of Indiana
Filed Dec. 13, 1965, Ser. No. 513,484
5 Claims. (Cl. 324—103)

This invention relates to electrical measuring devices and more particularly to an electronic peak measuring and holding device for use with a conventional null-balance recorder adapted to measure and hold signals from a sensing element.

Null-balance recorders are widely used to record signals obtained from primary elements such as thermocouples, strain gauges or any device which provides an electrical output proportional to the magnitude of the input signal. Typical process variables recorded in this fashion include flow, temperature, pressure, and compositional data, or physical properties as measured by various types of analytical instruments.

Occasionally, the peak value of the recorded signal is of importance. This is particularly true for certain analytical instruments, where amplitude of the signal reflects the value of the measured variable. Examples of such instruments include gas chromatographs, those which measure end-point, flash-point, and the like, and those which measure the strength of alkylation acid.

In some applications of analytical instruments, it is desirable to measure and retain the peak value of the recorded signal. For instance, analytical instruments which feed data to a process-control computer are usually equipped with peak holding devices. These devices retain peak values of signals, but do not interfere with the normal analytical function of the instrument. A peak reader, as these devices are otherwise known, facilitates the reading of data into a computer, for instance, because only a single reading corresponding to the maximum value of the signal is necessary and the reading operation can be done at the convenience of the computer.

Many of these peak reading devices have certain limitations, however. A device which utilizes a diode-capacitor circuit, for example, offers the simplest means of peak holding, but the results obtained with a circuit of this type are inaccurate because of the drop across the diode. Moreover, this arrangement will not work at all when the signal amplitude is less than a few tenths of a volt. Biasing the diode results in some improvement, but even then the circuit will operate only at signals greater than a tenth of a volt. (See Proceedings of the I.E.E.E., June 1963, page 953, column 2.) Also, other peak holding devices require DC amplifiers which are subject to drift and also tend to develop zero offsets. These limitations and disadvantages tend to limit their adaptability and their accuracy.

It has been discovered that many of these difficulties can be eliminated or substantially reduced through the utilization of the peak holding device in accordance with this invention. Briefly stated, this invention provides an improved electronic peak measuring and holding device for use with a null-balance recording system to measure and retain the peak maxima or minima value of AC or DC signals, from a sensing element and includes amplifying means to receive and amplify the signals and further, in response to these signals to provide power to drive a servomotor. The servomotor, in turn, is adapted to drive a measuring device to a position indicating the magnitude of the signals. The invention further includes phase detection means connected to the amplifying means adapted to simultaneously disconnect the servomotor from the amplifying means when the signals reverse from the direction being measured, apply a resistance load to the amplifying means, and apply a DC braking voltage to the servomotor to prevent the servomotor from drifting or coasting. Since the servomotor drives the measuring device the application of the braking voltage to the servomotor in effect prevents the measuring device from drifting and therefore a true reading of peak value is obtained.

The full nature of the invention will be more readily understood from the accompanying drawings and the following description and claims.

FIGURE 3 is a schematic diagram showing modification to the amplifier necessary for the installation of the peak holding device and also showing circuitry of the device itself.

Figure 1:
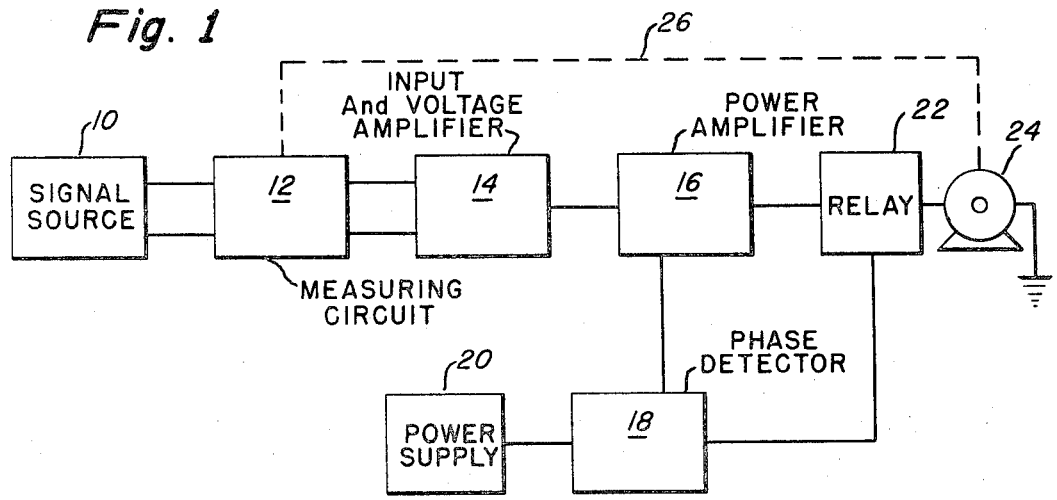
FIGURE 1 is a block diagram of an instrument system incorporating the peak holding device.

Referring first to FIGURE 1, a signal from signal source 10 is fed into measuring circuit 12. The signal source may be any type of transducer which converts a physical impulse or signal into an electrical signal. It may be one which supplies either an AC or DC signal. Measuring circuit 12 may include either a Wheatstone bridge or a potentiometric arrangement. The power supply (not shown) may be either an AC or DC source. The signal from 10 is balanced against a reference or datum point in the measuring circuit. An increase or decrease in the output of source 10 generates a signal in measuring circuit 12.

The signal is transmitted into input and voltage amplifier 14. A chopper is utilized in connection with input and voltage amplifier 14. If the signal from measuring circuit 12 is DC, it is first fed to the chopper and then to the voltage amplifier. If the signal is AC, the chopper is by-passed and the signal is fed directly to the voltage amplifier.

(The phase of the signal developed in measuring circuit 12 will be dependent on the direction of the change in the output of source 10.)

The signal from 14 is fed to power amplifier 16. Phase detector 18, which operates from power supply 20, is connected to power amplifier 16 at its power output stage. Phase detector 18 is connected to 16 in such a way that its presence does not interfere with the normal function of power amplifier 16. The details of phase detector 18 will be presented in more detail in the description of FIGURE 2 and FIGURE 3. It will suffice for this discussion to say that phase detector 18 is incorporated in power amplifier 16 by separating the triodes by the addition of a second cathode resistor. This in effect simplifies peak detection by elimination of the objections to the use of DC amplifiers. And as was pointed out above, this method of attaching phase detector 18 does not interfere with the normal operation of power amplifier 16.

Power amplifier 16, in response to the signal from input and voltage amplifier 14, drives servomotor 24 in the direction necessary to remove the imbalance in measuring circuit 12. Servomotor 24 is connected by linkage 26 to measuring circuit 12. The direction in which servomotor 24 turns, and thus the direction in which the indicator of measuring circuit 12 registers, is dependent on the phase of the signal from signal source 10. Therefore, the peak level registered by the indicator of measuring circuit 12 will be the peak level of the signal from signal source 10.

When the signal from signal source 10 reverses in direction, phase detector 18 functions through relay 22, which is connected to power amplifier 16 and servomotor 24 to disconnect servomotor 24 from power amplifier 16 so that downscale movement of the indicator in measuring circuit 12 is prevented. Simultaneously, with the disconnecting of servomotor 24, phase detector 18, operating through relay 22, switches a resistance load into the output circuit of power amplifier 16 to provide a load for the amplifier during the time it is disconnected from servomotor 24, and also a DC voltage is applied to the control winding of servomotor 24 to brake the servomotor and effectively prevent coasting or drifting. The result of this operation is that the indication of measuring circuit 12 will hold the true peak value of the signal from signal source 10.

By adapting a retransmitting slide wire (not shown) to measuring circuit 12, it is then possible to feed the value obtained into a computer.

Figure 2:
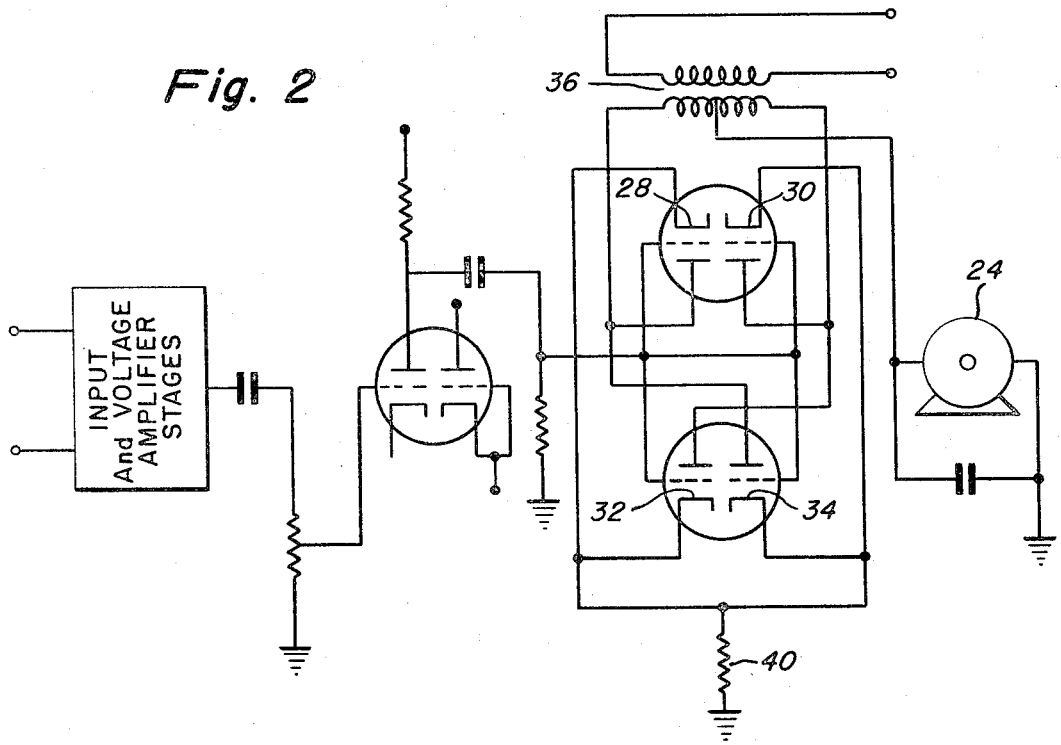
FIGURE 2 is a partial schematic diagram of the amplifier in a null-balance potentiometric recorder of the Brown type.

FIGURE 2 is a partial schematic diagram of the amplifier in a null-balance potentiometric recorder of the Brown type. The particular one described is manufactured by the Minneapolis-Honeywell Regulator Company. The power output stage of the amplifier is shown in detail consisting of triodes 28, 30, 32 and 34, along with output transformer 36, and servomotor 24 and cathode resistor 40. Using FIGURE 2 as reference, the modifications to the amplifier necessary for the installation of the peak holding device will be more readily understood.

Referring now to FIGURE 3, the modifications to the amplifier of FIGURE 2 necessary for the installation of the peak holding device are shown. The peak holding circuitry is shown schematically mounted on a separate chassis in the area bounded by the broken lines. These modifications consist of adding a second cathode resistor 42 which is connected to cathodes 28 and 34. Resistor 40, the original cathode resistor, is connected to triodes 30 and 32. Resistors 40 and 42 are each 150 ohms. Insertion of the second cathode resistor in the output stage of the amplifier does not affect the performance of the amplifier.

Further circuit modification is made at the output of the amplifier. The output, taken from the center tap of transformer 36, is fed through plug connector 44 on the peak reader chassis to common contact 5 and normally closed contact 4 of relay 22. From this point, connection is made back through plug connector 44 to servomotor 38. Thus, when the contacts of relay 22 are closed, the amplifier is connected to servomotor 38 as is normally the case in the unmodified circuit.

As pointed out above, the area bounded by the broken lines represent the circuitry of the peak reader in which meter monitor 60 is the heart of the peak holding device. One suitable monitor for use with the embodiment of the invention described is the Magsense Meter Monitor Model 70 manufactured by the Control Data Corporation. Meter monitor 60 is a sensitive solid-state switch which is activated by a few micro-amperes at the input. Relay 22 is operated by the switching action of meter monitor 60. Circuit details for meter monitor 60 are not included in FIGURE 3 because it is a standard item available commercially. No modification of the meter monitor is required for its use in this application.

The operation of the device is as described above. The input signal for meter monitor 60 is derived from the resistor network connected to cathode resistors 40 and 42. Polarity of the signal will differ depending upon whether the signal from the sensing element connected to the input of the servo or power amplifiers is increasing or decreasing in level.

For example, assume that the signal from the sensing element increases in a positive direction; the servo or power amplifier will respond by driving the servomotor, thereby causing the recorder pen to move up scale. During upward movement of the indicator, triodes 30 and 32 are conducting causing servomotor 38 to drive. Simultaneously, triodes 28 and 34 are virtually non-conducting. Therefore, the ungrounded end of cathode resistor 40 will be positive with respect to the corresponding end of cathode resistor 42. The ungrounded ends of 40 and 42 are connected thru plug connector 44 to the network consisting of resistors 48, 50 and dual-ganged potentiometer 52, 54 from which is derived the input signal for meter monitor 60. With the high end of resistor 40 positive with respect to the high end of resistor 42, polarity of the input signal at terminals 56 and 58 of monitor 60 is such that terminal 56 is positive with respect to terminal 58. Under these conditions, meter monitor 60 will not swich and relay 22 is not energized. Thus the amplifier and servomotor will respond in normal fashion to signals producing up scale movement of the indicator.

When the signals at the input of meter monitor 60 reverse in direction, or as in the example being given, in a negative direction the indicator on the recorder will not move down scale. Such signals cause triodes 28 and 34 to conduct with the result that the upper end of cathode resistor 42 is positive with respect to the corresponding end of cathode resistor 40 because triodes 30 and 32 are nonconducting under these conditions. Correspondingly, a signal of the proper polarity to cause switching is applied to input terminals 58 and 56 of meter monitor 60. Switching occurs, pulling in relay 22, disconnecting servomotor 38 from the amplifier, thereby preventing down scale movement of the indicator. Resistor 98 is switched into the amplifier output circuit to provide a load for the amplifier during the time it is disconnected from servomotor 38. Simultaneously, a DC voltage is applied to the control winding of servomotor 38 through the remaining set of contacts of relay 22. This voltage effectively brakes servomotor 38 preventing coasting or drifting.

Power for the peak holding device is derived from the transformer 46, which has three secondary windings. One winding is connected to a voltage doubler circuit to provide about 10 volts DC for operation of meter monitor 60. A second winding, along with rectifier 80 and associated filter network, supplies about 25 volts DC to relay 22. This voltage is switched by meter monitor 60 for control of relay 22. A third winding connected to half-wave rectifier 94 and filter circuits 90, 96, and 88, provides the DC braking voltage applied to servomotor 38.

This invention, through the installation of switching means (not shown) such as a double pole-double throw toggle switch connected between cathode resistors 40 and 42, and the input to the meter monitor will provide for selection of reading either peak maxima values or peak minima values as desired. Gating of the device is accomplished by simply placing a gate switch across contacts 100 and 102. This will allow the recorder to operate in normal fashion without operating the peak holding device. Also set up adjustments are not critical. A meter 104 with a 100–0–100 $\mu$amp movement is used to read control current level, which is set by means of dual-ganged potentiometer 52, 54. This adjustment is stable and will not need readjustment after the instrument is placed in operation.

The foregoing description and discussion illustrates that this invention provides for a low cost peak holding device which, while not sacrificing accuracy and sensitivity of the recording instrument, has simplified phase detection at the power output stage of the servo or power amplifier by a simple resistor network and also prevents drifting or coasting of the servomotor, thereby giving true peak readings.

In FIG. 3, the components in the amplifying section, with the exception of the additional cathode resistor 42 are those found in Brown amplifiers. The value of the components in the peak reader circuitry in the embodiment described are as set forth below:

| Component: | Value |
|---|---|
| Resistors 48, 50 | 2K, ½ W. |
| Pots 52, 54, 60 | 2K2W wire wound Magsense Meter Monitor Model 70. |
| Capacitors 62, 64, 66 | 50 µf., 25WVDC. |
| Rectifiers 68, 70, 80, 94 | 1N2070. |
| Resistor 72 | 39K, 1 w. |
| Capacitors 74, 76 | 50 µf., 50WVOC. |
| Resistor: | |
| 78, 92 | 33 ohms, ½ w. |
| 82 | 100 ohms, 1 w. |
| 84 | 3K, 10 w. |
| 86 | 68K, 2 w. |
| Relay 22 | Potter and Brumfield—1M2 11122. |
| Capacitors 88, 90 | 200 µf., 400WVDC. |
| Resistor: | |
| 96 | 100 ohms, 2 w. |
| 98 | 350 ohms, 10 w. |
| Transformer 46 | Triad F–42A Primary 117-VAC, Secondary 125-VAB, 6VAC, 12VAC. |

Obviously, many alternatives, modifications and variations will be apparent to those skilled in the art. However, it is intended that these alternatives, modifications, and variations as fall within the spirit and broad scope of the invention, as well as to embrace all other uses for the inventive apparatus, fall within the scope of the appended claims.

What is claimed is:

1. An electronic peak measurement and recorder device comprising; reference phase signal means; null-balance measuring means to detect an input signal and producing an output error signal of a first phase with respect to the reference phase when unbalanced in a first direction from a null position and producing an output error signal of a second phase 180 degrees displaced from the first phase when unbalanced in a second direction from the null position; an amplifier responsive to the output of the measuring means; a servo motor; a load resistance; relay switch means, when deactivated, for simultaneously coupling the servo motor to the output of the amplifier and decoupling the load resistance from the output of the amplifier, and, when activated, simultaneously decoupling the servo motor from the output of the amplifier and coupling the load resistor to the output of the amplifier; said servo motor being coupled to drive the measuring means to a rebalance condition in response to the output of the amplifier; a phase detector for comparing the phase of the error signal with the reference phase and for producing an output when the error signal phase and the reference phase differ; means coupling the output of the phase detector to the relay to operate the relay when the error signal phase differs from the reference phase; whereby the measuring means will be driven in one direction only and remain at its peak value for a time sufficient to record the peak of the input signal.

2. The device as defined in claim 1 wherein said phase detection means is further adapted to apply simultaneously with the disconnecting of said servomotor means and applying of said resistance load to said amplifying means a DC braking voltage to said servomotor means, thereby preventing said servomotor means from drifting.

3. The device as defined in claim 1 further characterized by switching means adapted to disconnect said measuring means from said recorder whereby said recorder will operate in normal fashion.

4. The device as defined in claim 1 further characterized by switching means adapted to return said measuring means to a position below its peak position after said peak value has been recorded.

5. The device as defined in claim 1 wherein said phase detection means detects the phase of said signals from said amplifying means at the power output stage of said amplifying means and, in response to said signals, supplies a DC signal to a switch means adapted to control said servomotor means.

No references cited.

RUDOLPH V. ROLINEC, *Primary Examiner.*

E. F. KARLSEN, *Assistant Examiner.*